United States Patent [19]

D'Amato et al.

[11] Patent Number: 4,933,120
[45] Date of Patent: Jun. 12, 1990

[54] COMBINED PROCESS OF PRINTING AND FORMING A HOLOGRAM

[75] Inventors: Salvatore F. D'Amato, Floral Park, N.Y.; Peter Sorbo, Stamford, Conn.; Richard E. Dunning, Claremont, Calif.

[73] Assignee: American Bank Note Holographics, Inc., Elmsford, N.Y.

[21] Appl. No.: 183,005

[22] Filed: Apr. 18, 1988

[51] Int. Cl.$^5$ .................. B29D 11/00; B29C 39/10
[52] U.S. Cl. .................................. 264/13; 264/1.4; 264/1.7; 264/1.9; 264/22; 264/132; 427/44; 427/54.1; 427/256; 427/258; 427/288
[58] Field of Search ............... 264/1.3, 132, 135, 22, 264/1.4, 1.7, 1.9; 283/904; 427/7, 44, 54.1, 256, 258, 288

[56] References Cited

U.S. PATENT DOCUMENTS

| | | |
|---|---|---|
| 3,565,978 | 2/1971 | Folger et al. |
| 4,246,297 | 1/1981 | Nablo et al. |
| 4,294,782 | 10/1981 | Froehlig ............... 264/22 |
| 4,329,385 | 5/1982 | Banks et al. |
| 4,420,502 | 12/1983 | Conley |
| 4,427,732 | 1/1984 | Gray, III et al. |
| 4,490,409 | 12/1984 | Nablo et al. |
| 4,521,445 | 6/1985 | Nablo et al. |
| 4,560,578 | 12/1985 | Freeman |
| 4,728,377 | 3/1988 | Gallagher ............... 283/904 |
| 4,758,296 | 7/1988 | McGrew |

FOREIGN PATENT DOCUMENTS

| | | |
|---|---|---|
| WO88/09252 | 1/1988 | PCT Int'l Appl. |
| 1264712 | 2/1972 | United Kingdom ........ 283/904 |
| 1548588 | 7/1979 | United Kingdom ........ 283/904 |
| 4019257 | 10/1979 | United Kingdom |
| 2027441A | 2/1980 | United Kingdom |

OTHER PUBLICATIONS

"Advances in Electron Curing for High Speed Converting", Nablo et al., 1978 Paper Synthetic Conference, TAPPI, 1978.
"Recent Development in Electron Beam Curing", Tripp, presented at Radcure in Europe, 5/87, pp. 10-9 to 10-15.

Primary Examiner—James Lowe
Attorney, Agent, or Firm—Majestic, Parsons, Siebert & Hsue

[57] ABSTRACT

A new technique and apparatus for printing that includes the formation of a hologram, or other type of diffraction pattern, directly on a desired end product of paper, or other sheet material. The hologram, or other diffraction pattern, is formed by casting a surface relief pattern directly onto the sheet material in a limited area.

73 Claims, 2 Drawing Sheets

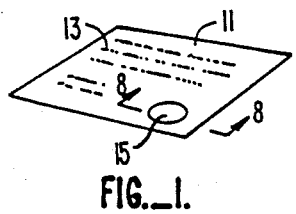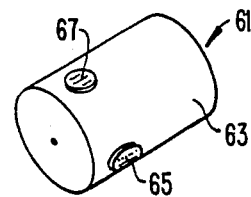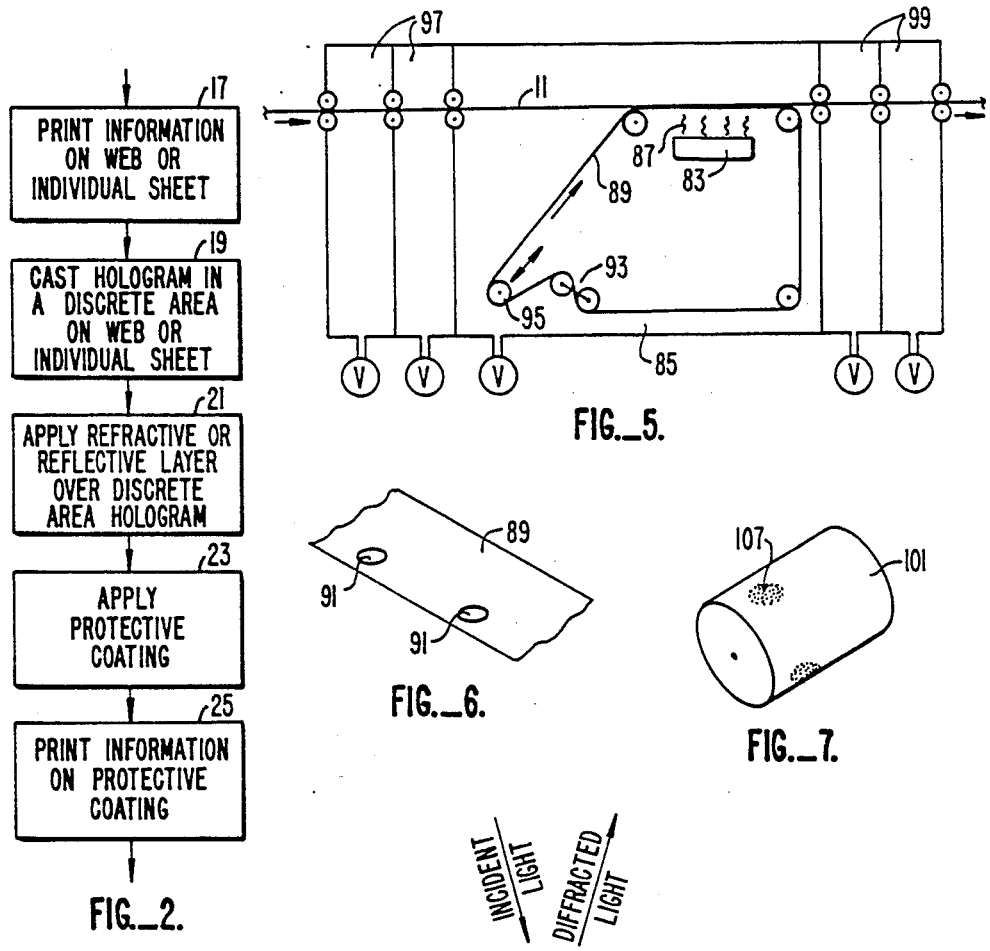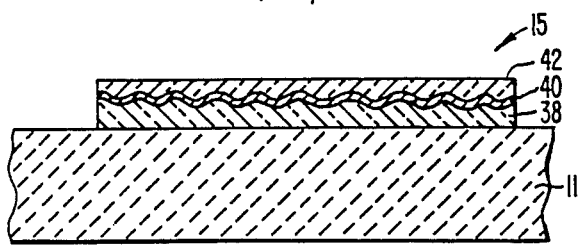

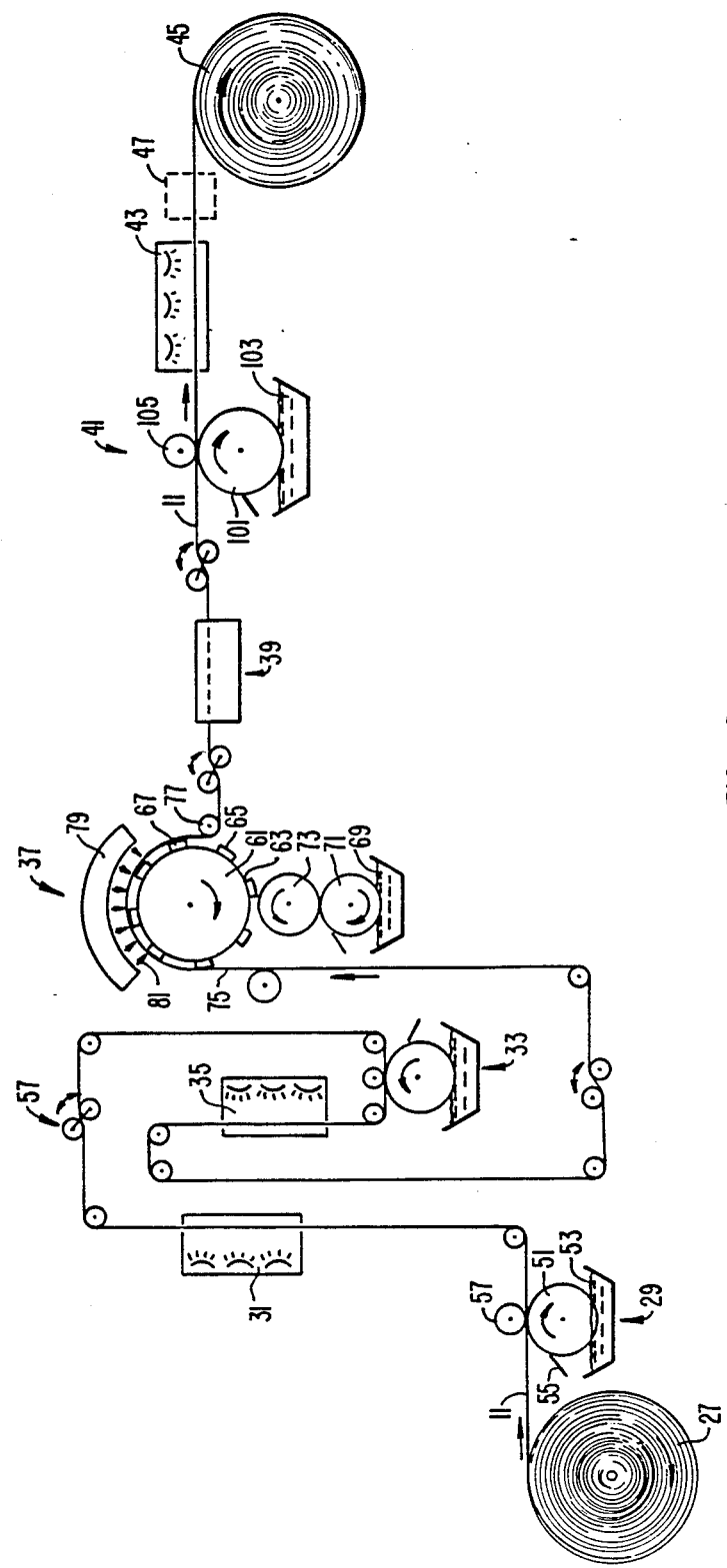
FIG._3.

COMBINED PROCESS OF PRINTING AND FORMING A HOLOGRAM

BACKGROUND OF THE INVENTION

This invention relates generally to the formation of a hologram on a document or other article as part of a printing process.

Holograms and other types of diffraction gratings are commonly attached to a document or other article containing printing. An example is the attachment of holograms to credit cards in order to authenticate their genuineness and increase the difficulty of conterfeit credit cards being used. Holograms are used, or proposed to be used, as anti-counterfeiting devices on a number of other types of documents, such as stock certificates, identification badges, passports, and even currency. Holograms are also attached to printed documents and articles for other reasons, such as their decorative effect.

The predominant method of manufacturing such documents and articles currently being practiced involves separately manufacturing the printed document and the hologram, and then, as a last step, attaching the hologram to the printed document or article. The holograms are generally manufactured in the form of a roll of material, either having a simple pressure-sensitive adhesive on one side for attachment to such a document or article, or in the form of hot-stamped foil wherein the hologram is released from a carrier and attached to a document or article by application of heat and pressure. In either case, the hologram usually carries the holographic information in a surface relief pattern that is formed either by embossing into a film or by casting a liquid resin. The resulting surface relief pattern is metallized in order to form a reflective surface which diffracts incident viewing light into formation of a reconstructed image.

It is a primary object of the present invention to improve the efficiency, and thus reduce the cost, of the process for manufacturing documents or other articles that contain both printing and a hologram or other type of diffraction grating attached thereto.

SUMMARY OF THE INVENTION

This and additional objects are accomplished by the various aspects of the present invention, wherein, briefly and generally, holograms are formed directly on documents, sheets or other article substrates as part of a printing process. The printing and hologram formation may be accomplished in a single, continuous process, wherein blank sheet material, such as paper, is sequentially passed through printing and hologram forming stations, either as individual sheets or articles or as part of a continuous web thereof. Alternatively, the printing and hologram formation steps may be performed in separate discrete steps.

In a preferred form of the invention, the hologram is formed by casting directly onto the document or article in a specifically defined area thereof, followed by coating with a reflective or refractive material only that region of the sheet or article where the hologram has been cast. Printing of the sheet or other article can be performed either before, or after (or both before and after) the formation of the complete hologram, depending on the particular application.

Additional objects, features and advantages of the various aspects of the present invention are included in the following description of its preferred embodiment, which description should be taken in conjunction with the accompanying drawings.

BRIEF DESCRIPTION OF THE DRAWINGS

FIG. 1 illustrates an example of a document manufactured by the process of the present invention;

FIG. 2 outlines the steps of the process followed in manufacturing the document of FIG. 1;

FIG. 3 schematically illustrates an example continuous process for manufacturing articles of the type illustrated in FIG. 1 in carrying out the method outlined in FIG. 2;

FIG. 4 shows a component of the apparatus used in FIG. 3;

FIG. 5 shows another component of the apparatus shown in FIG. 3;

FIG. 6 shows a piece of the component of FIG. 5;

FIG. 7 shows yet another component of the continuous process apparatus of FIG. 3; and FIG. 8 illustrates an enlarged cross-sectional view of the hologram of the example document of FIG. 1 taken at section 8—8 thereof.

DESCRIPTION OF THE PREFERRED EMBODIMENTS

Initially referring to FIG. 1, an example is shown of a document that is manufactured by the process to be described. A cut sheet of paper 11 contains printed information 13 and a hologram 15 attached to at least one surface. An example of such a document is a stock certificate, where the hologram serves to authenticate the genuineness of the document. In some cases, the hologram 15 is applied to a region of the document 11 that contains none of the printing 13, and nothing is printed over the hologram 15. In other cases, it is either more convenient or desired for asthetic reasons to either form the hologram 15 on the sheet 11 in a region that has already been printed upon, or will be printed upon after the hologram is formed.

The process to be described as an example utilizing the various aspects of the present invention accomplishes the printing and hologram formation on a blank sheet as part of a continuous process. This may be accomplished on individual pre-cut blank sheets, or, as described with respect to the example of FIG. 3, a continuous web of sheet material. Although paper is being used in the examples being described as the substrate upon which the printing and hologram formation occur, other flexible material, such as plastic film, may also be processed according to the techniques being described. Additionally, less flexible materials, such as stiff paper or cardboard, and substantially rigid materials, such as plastic used for credit cards and the like, can be processed in the manner to be described. Of course, for substantially rigid articles to be manufactured, individually cut sheets or blanks will be processed rather than a continuous web of such material, since a length of it cannot easily be changed in direction around rollers, unless small blanks are attached to a web. Alternatively, to make rigid articles, flexible material may first be processed by printing and the formation of a hologram thereon, and then that material is formed into the rigid article by attachment to additional layers that render the end product substantially rigid.

FIG. 2 outlines very generally the combined printing and hologram formation steps involved in manufacturing the product of FIG. 1. A first step 17 is to print the information 13 on the sheet material 11. Next, in a step 19, the hologram 15 is partially formed by casting a surface relief pattern with liquid resin on the discrete area where the hologram is to be formed, and then curing that resin until it is firm, as described more fully hereinafter. A next step 21 applies a thin layer of material to the surface relief pattern of the cured resin so that light is reflected from it and diffracted into an image of an object or light pattern that was utilized when the master hologram being replicated was initially made. This layer is most commonly a reflective metal material, usually aluminum. A next step 23 applies a protective coating over the hologram, if necessary, this step being optional. In a final optional step 25, information is printed over that protective coating when desired for special visual effects. Additionally, the printing step 17 can be performed after the hologram has been formed on the sheet 11, namely after step 23, rather than as an initial step as indicated in FIG. 2, but that is usually less desirable.

Throughout this description, a hologram 15 is specified to be formed on the sheet material since, for most applications, a hologram is a preferred form of optical device. However, other diffraction gratings not considered to be holograms may also be useful, depending upon the application. In applications where the hologram is being used to authenticate the document or article on which it is formed as an anti-counterfeiting device, it is generally desirable to use a hologram that reconstructs an image of a three-dimensional object since that type of device is most difficult to counterfeit. Such a hologram is also preferred for many product packaging, advertising, and other non-authenticating commercial applications. However, devices that diffract light into something other than a focused image are also useful in many commercial applications, and can even be useful in anti-counterfeiting applications if the light pattern is easily recognizable to distinguish a genuine from a counterfeit document or article. The process being described herein is suitable for the formation of nearly all such holograms or diffraction gratings.

Referring to FIG. 3, a form of a printing press is illustrated to have a stage included for forming a hologram in a printing-like way. This example is of a continuous process that utilizes the various aspects of the present invention. A roll 27 of a continuous web of flexible sheet material, blank paper in this example, is the raw material upon which the printing and hologram are formed in a single process.

The first step in the process, indicated by step 17 of FIG. 2, is to print information on the paper. In this example, information is so printed on both sides of the paper. A first printing station 29 does so on one side, followed by drying the ink in an oven 31. Printing on the other side of the paper 11 is accomplished by a process station 33, followed by passing the sheet material through a dryer 35. Of course, one of the printing stations 29 or 33 could be eliminated, depending upon the application.

A processing station 37 that follows the printing stations accomplishes the first step in forming a hologram on the same side of the paper on which printing is accomplished by the station 29. That first hologram forming step, indicated as step 19 in FIG. 2, forms a casting of a surface relief pattern of the hologram or diffraction grating being formed. This casting is shown at 38 on the cross-sectional view of FIG. 8. It is attached to the substrate paper 11. A next major step in the process of FIG. 3 is accomplished by processing station 39 which adds a thin layer 40 of a reflective film or refractive layer to the structure illustrated in FIG. 8. The usual material for the layer 40 is a reflective metal, such as a thin layer of aluminum. This corresponds to the step 21 of FIG. 2. Next, according to the step 23 of FIG. 2, a optional protective coating 40 (FIG. 8) may be applied over the reflective film or refractive layer 40 by a processing station 41 (FIG. 3) for those applications requiring such protection. Drying and hardening of the layer 42 is accelerated by passing the web through an oven 43.

The long web of the continuous number of documents so formed may alternatively be either rolled into a roll 45 for later cutting into the individual documents, or may be so cut as part of the continuous process being described. Additionally, before such cutting or rolling of the web, an optional step 47 shown in dotted outlines may be accomplished. That optional step can be the overprinting of information on the protective coating 42, as indicated by step 25 of FIG. 2. Also, as previously described, the entire printing operation, described in FIG. 3 to occur initially in the process, can alternatively be relocated to the position indicated at 47, after the hologram is formed.

Although a continuous process of forming a document or article is described with respect to FIG. 3, an alternative is to first process an entire length of continuous web or full stack of individual sheets of documents or articles with less than all of the processing steps illustrated in FIGS. 2 and 3 before any of them are treated with any of the subsequent processes. The partially treated web or sheets are then passed through the other processing stations as a unit. For example, the printing of step 17 (FIG. 2) and processing stations 29 and 33 may first be completed on an entire length of continuous web or full stack of sheets, followed by that web or stack then being passed through the processing stations 37, 39 and 41 in order to form a hologram on each document according to the steps 19–23 of FIG. 2.

Preferred forms of the processing stations of FIG. 3 will now be described. One of many possible standard printing techniques is schematically illustrated for printing station 29, the use of a Gravure cylinder 51. Such a cylinder typically has a very smooth surface except for carefully machined indentations arranged in a desired printing pattern. Ink is applied to the surface of the cylinder 51 as it is rotated, illustrated in FIG. 3 as an ink reservoir 53 through which the cylinder 51 rotates its external surface. A blade 55 wipes off any excess ink from the outside of the cylinder 51 before its surface contacts the sheet material 11. Upon contact, ink carried by the holes in the cylinder is transferred to the sheet material 11. An impression roller 57 maintains the sheet material in close contact with the cylinder 51. Of course, other known printing techniques may be utilized in this stage of the process in place of that specifically illustrated, such as a flexographic, offset or silk screen technique.

If printing is desired on the back side of the sheet as well, the printing station 33 is provided and most conveniently is of the same type as that chosen for the printing station 29. Between stations 29 and 33 is a registration compensator 57 that operates to adjust the total path length of the sheet between the two printing stations. As is typical in any such printing process, registration marks are initially applied to edges of the continuous web sheet material and these marks are detected at specific locations along the length of the web by appropriate sensors (not shown). Signals from these sensors then cause operation of path length compensators, such as that indicated at 57, so that the printing done by one station is in proper registration with that done by another station. Such a registration compensator is desirably positioned between each major station in the process illustrated in FIG. 3, as is indicated thereon.

The next station 37 accomplished a first step of forming the hologram 15. That step simultaneously performs two operations: (1) a quantity of liquid resin is applied to the appropriately defined, discrete area of the sheet material 11 where the hologram is to be formed, and (2) molds that resin to contain a surface relief pattern of a master hologram and cures the resin into a hardened state. The result of the processing stage 37 is the layer 38 (FIG. 8) of the hologram without the layers 40 and 42 having yet been applied. It is possible for the process to independently perform the two operations enumerated above, but it is preferred to do so in a single operation in order to eliminate having to carefully register the second operation with the first.

The processing stage 37 includes a cylinder 61 having a generally smooth cylindrical surface 63 except for a plurality of raised portions 65, 67, etc. A perspective view of such a cylinder 61 is given in FIG. 4. Each of the raised portions 65, 67, etc. contain on their outer surface a surface relief pattern in a hard material that corresponds to the hologram or other diffraction pattern to be formed on the sheet material 11. As is well known, such a surface relief pattern is initially optically formed in photoresist or similar material, and then a metal master hologram is made from that delicate photoresist master by an electrolysis technique. Such a master hologram can then be used to make sub-master holograms, all of which have the same surface relief pattern as the initial optically made photoresist master. It is the sub-master holograms that are mounted on the raised portions 65, 67 etc. of the cylinder 61.

Liquid resin material, indicated schematically as a reservoir 69 in FIG. 3, is transferred to the surface relief masters on the raised portions 65 and 67 by an anilox roll 71 and an elastomeric transfer roll 73. The roll 71 is like a Gravure cylinder but has holes over substantially its entire surface for uniformly transferring liquid from the reservoir 69 to the elastomeric roll 73. The roll 73 is positioned with respect to the cylinder 61 so that it contacts the raised portion 65, 67 etc. but does not contact the smooth surface 63. The elastomeric nature of the roll 73 also allows the transfer to be accomplished without damaging the very fine detail of the surface relief pattern carried by the raised portions 65 and 67. This, in combination with guiding the sheet material 11 around the roll 61 so that it too does not contact the surface 63, limits placement of the liquid resin on the sheet material 11 to only those areas where it is desired to form a hologram.

The resin utilized for the hologram may be chosen from a number of known compounds that are currently used for coating sheet material in a manner to form a decorative pattern. Of course, a specific compound selected must be compatible with the very fine groove pattern of the surface relief hologram sub-masters that serve as a mold for the resin.

A hologram master containing raised portions of the cylinder 61 first contacts the continuous web sheet material 11 at about a location indicated at 75 and stays in contact with the sheet material, without any relative movement therebetween, until it has been rotated to a position in the vicinity of a guide roller 77. In that interval, the resin trapped between the raised portions of the cylinder 61 and the sheet material is cured in order to harden it. This is accomplished by directing a source 79 of actinic radiation 81 through the sheet material 11 to the trapped resin. The type of radiation that is used depends primarily upon the particular resin formulation and the nature of the sheet material 11. For sheet material of paper or other opaque substances, electron beam radiation is preferable. For optically transparent sheet material, either totally or partially, ultraviolet radiation can alternatively be used. When a raised portion of the cylinder 61 has been rotated around to the vicinity of the roller 77, a liquid resin is firmly attached to the sheet material and has been molded to carry the surface relief pattern of the master hologram.

There are several ways in which a reflective coating 40 (FIG. 8) can then be applied to the surface relief pattern. It is preferable to directly apply the reflective material only to the area of the sheet material where the hologram replica is being formed. Alternatively, the entire sheet can be coated with a reflective layer, such a aluminum, and then that portion of the layer outside the area of the hologram can be removed by known photoresist masking and etching techniques. Such a removal is not, however, appropriate for many types of sheet material substrates, such as paper, and further is not desired where printing has already been accomplished since etching of the reflective material layer can also remove the printing. Therefore, the preferred technique illustrated with respect to the drawings, particularly FIG. 5 thereof, applies a thin reflective aluminum layer 40 (FIG. 8) in registration with the area of the cured resin 38.

FIG. 5 shows a schematic cut-away view of a discrete area metallizer of a known type. A bath 83 of molten aluminum is heated within a vacuum chamber 85 until it is boiling. Vapor 87 coming off the boiling aluminum liquid condenses on those portions of the sheet material 11 not obscured by a mask 89. As shown in FIG. 6, the mask 89 is solid except for a plurality of periodically spaced holes 91 that are positioned to correspond with the locations on the sheet material 11 where the hologram is being formed. The mask 89 is a continous belt that is guided by roller in a path that contacts the sheet web material 11 as it passes through the vacuum chamber 85. An appropriate registration device 93, along with a positionable roller 95, allows relative adjustment of the masked holes 91 with respect to the sheet material 11, using known techniques and equipment. A supply of aluminum is provided for the container 83 in order to replace that which is vaporized and condensed on the sheet material 11 and mask 89. As is well known, an input to the vacuum chamber 85 includes a plurality of air-lock chambers 97 and its output similarly includes a plurality of air-lock chambers 99.

Other techniques and apparatus may also be used for discrete area metallization. The sputtering of aluminum onto the sheet material 11 in designated areas is a possibility, but sputtering equipment is generally quite complicated. A silver reduction technique is a possibility, wherein one reacting component is included in the resin material which is, as described, only applied to that area of the sheet material 11 where the hologram is to be positioned. Subsequently, another reacting component may be sprayed in a fine mist over the entire sheet material 11, reacting only with the component in the resin to form a thin reflective layer only on the surface relief pattern. The material sprayed over the rest of the sheet will have no effect.

Although use of a reflective layer is generally preferred for the layer 40, an alternative is to coat the surface relief pattern on the surface of the cast layer 38 with a substantially transparent material having a refractive index that is significantly different than that of the resin layer material. Light is then diffracted from the surface relief pattern at the interface of those two layers. The top layer will generally be smooth on its top surface and no other protective layer is required.

A next optional step, which unnecessary to form an operable hologram but often desirable to protect the hologram that has already been formed, is to coat the metallized layer 40 (FIG. 8) with an optically clear layer 42 that provides physical protection against abrasion and the like. The layer 42 also provides a surface on which a pattern or information may optionally be printed after the hologram is complete. It is generally desirable to limit the formation of the protective coating 42 to the area of the sheet 11 where the hologram is being formed, although for certain applications and products it may be desirable to coat the entire surface. The processing station 41 of FIG. 3 is designed to overcoat only the hologram and utilizes as a primary component thereof another Gravure cylinder 101 which transfers a liquid coating material from a supply indicated as a bath 103 to the sheet material 11. The sheet material 11 is forced to contact the cylinder 101 by an impression roller 105. As shown in FIG. 7, the cylinder 101 has its large number of liquid retaining holes grouped in a plurality of patterns, such as the pattern 107, that corresponds to the shape of the hologram being formed. Thus, with the additional use of existing web registration techniques used in the printing industry, liquid from the reservoir 103 is applied only to the area of the hologram.

Although the various aspects of the present invention have been described with respect to its preferred embodiments and specific examples thereof, it will be understood that the invention will be entitled to protection within the full scope of the appended claims.

It is claimed:

1. A method of treating sheet material of a given area, comprising the steps of:
   printing a visual pattern on at least one side of said sheet material,
   providing a transfer surface containing at least one physically defined area of a discrete surface relief light diffraction pattern that is significantly less than the sheet material given area,
   applying casting resin in liquid form to said at least one discrete pattern area in a manner to substantially avoid coating any other areas of said transfer surface,
   contacting said at least one side of said sheet material with said resin coated discrete pattern area, thereby to contact said sheet material with said resin in a discrete area corresponding to the discrete pattern area of the transfer surface, said contacting step occurring sometime after the printing step,
   directing actinic radiation to said resin in a manner to harden said resin and cause it to adhere to said sheet material while being held against the sheet material by the transfer surface relief pattern without movement therebetween,
   separating said transfer sheet discrete pattern area from the hardened resin, thereby to leave the hardened resin in place on said sheet material with the surface relief pattern contained therein, and
   coating substantially only the hardened resin in said discrete area with a reflective material in a manner to follow the surface relief pattern,
   whereby said sheet material is treated with both conventional printing and a light diffraction pattern.

2. The method according to claim 1 comprising the additional steps of applying a substantially transparent overcoating to said reflectively coated hardened resin surface relief pattern, and printing a visual pattern over at least a portion of said overcoating.

3. A method of treating sheet material of a given area, comprising the steps of:
   providing a transfer surface containing at least one physically defined area of a discrete surface relief light diffraction pattern that is significantly less than the sheet material defined area,
   applying casting resin in liquid form to said at least one discrete pattern area in a manner to substantially avoid coating any other areas of said transfer surface,
   contacting at least one side of said sheet material with said resin coated discrete pattern area, thereby to contact said sheet material with said resin in a discrete area corresponding to the discrete pattern area of the transfer surface,
   directing actinic radiation to said resin in a manner to harden said resin and cause it to adhere to said sheet material while being held against the sheet material without movement therebetween by the transfer surface relief pattern,
   separating said transfer sheet discrete pattern area from the hardened resin, thereby to leave the hardened resin in place on said sheet material with the surface relief pattern contained therein,
   coating substantially only the hardened resin in said discrete area with a reflective material in a manner to follow the surface relief pattern, and
   thereafter printing a visual pattern on said at least one side of said sheet material,
   whereby said sheet material is treated with both conventional printing and a light diffraction pattern.

4. The method according to either of claims 1 or 3 comprising the additional step of applying a substantially transparent overcoating to said reflectively coated hardened resin surface relief pattern.

5. The method according to either of claims 1 or 3 comprising the additional step of applying a substantially transparent overcoating to said reflectively coated hardened resin surface relief pattern by use of a Gravure cylinder.

6. The method according to either of claims 1 or 3 wherein said at least one side of said sheet material is initially visually blank.

7. The method according to either of claims 1 or 3 wherein the process is repeated on individual cut pieces of said sheet material.

8. The method according to either of claims 1 or 3 wherein the process is repeated on said sheet material in the form of a continuous web.

9. The method according to either of claims 1 or 3 wherein the step of reflective material coating includes the step of evaporating aluminum onto said hardened resin through a mask substantially in the shape of the resin.

10. The method according to either of claims 1 or 3 wherein the step of directing actinic radiation includes the step of directing a beam of electrons through said sheet material to said resin.

11. The method according too either of claims 1 or 3 wherein the step of holding a surface relief pattern against the resin includes the step of chosing the surface 12. The method according to either of claims 1 or 3 wherein the steps of providing a transfer surface and applying a resin include the steps of:
providing said surface relief pattern in a raised portion of a supporting surface having a shape and area corresponding to that of the desired diffraction pattern, and
touching the raised surface relief pattern with a carrier of the resin without so touching the surrounding said other areas of said transfer surface.

13. The method according to either of claims 1 or 3 wherein said sheet material is flexible.

14. The method according to either of claims 1 or 3 wherein said sheet material is paper.

15. The method according to either of claims 1 or 3 wherein all the steps recited therein are performed in a continuous process.

16. The method according to either of claims 1 or 3 wherein the steps of printing and contacting with resin the sheet material are accomplished in substantially non-overlapping areas of said at least one side of the sheet material.

17. The method according to either of claims 1 or 3 wherein the step of directing actinic radiation includes directing said radiation through the sheet material to reach the resin.

18. The method according to either of claims 1 or 3 wherein the step of providing a transfer surface includes the step of providing said surface as a cylindrical outside surface of a rotating drum.

19. The method according to either of claims 1 or 3 wherein the step of providing a transfer surface includes the step of providing said surface as a cylindrical outside surface of a rotating drum, wherein said at least one discrete surface relief light diffraction pattern is raised above said other transfer surface areas and is substantially surrounded thereby.

20. A method of mass producing replicas on sheets of material of a surface relief light diffraction pattern, comprising the steps of:
providing a master of said surface relief light diffraction pattern in a defined area and attached to a carrier in a manner to be substantially surrounded by regions without a surface relief pattern,
applying casting resin in liquid form to the surface relief master in a manner to substantially avoid coating said surrounding regions of said carrier,
contacting one side of a sheet of material with at least the resin coated surface relief master, thereby to contact said sheet material with said resin in an area corresponding to that of the surface relief master,
curing said resin while being held inbetween the sheet material and the surface relief master without movement therebetween, thereby to substantially harden the resin in attachment with said sheet material, and
separating said surface relief master from the hardened resin and sheet material, thereby to leave the hardened resin in place on said sheet material with the surface relief light diffraction pattern of said master contained in a surface thereof, and
repeating the foregoing steps on additional sheets in sequence, thereby casting the same replicas of said surface relief diffraction pattern on a plurality of sheets of material.

21. A method according to claim 20 which comprises an additional step of printing a visual pattern with ink on said one side of said sheet material.

22. A method according to claim 21 wherein the step of printing the sheet occurs before the step of contacting the sheet with resin.

23. A method according to claim 21 wherein the steps of contacting the sheet with resin, curing the resin and separating the pattern area from the hardened resin all occur before the printing step.

24. A method according to any one of claims 21-23, inclusive, wherein the printing step includes printing the visual pattern on an area of the sheet material that is substantially non-overlapping with said hardened resin light diffraction pattern replica.

25. A method according to claim 23 wherein the printing step includes printing over the hardened resin.

26. A method according to claim 20 wherein the sheet material has a given area and the step of providing a master of the surface relief pattern includes providing said surface relief pattern defined area to be significantly less than the sheet material given area, thereby to form a cast diffraction pattern replica that occupies only a portion of the sheet material.

27. A method according to claim 20 wherein said sheet material is paper.

28. A method according to claim 20 wherein said sheet material is flexible.

29. A method according to claim 20 wherein said sheets of material are separate at the time of their processing.

30. A method according to claim 20 wherein said sheets of material are provided in the form of a continuous web at the time of their processing.

31. A method according to claim 20 wherein said surface relief diffraction pattern includes a hologram characterized by forming a discernible image of an object upon reflecting light therefrom.

32. A method according to claim 20 wherein the steps of providing a master and applying casting resin include the steps of:
providing said surface relief master in a raised portion of a supporting surface carrier, and
contacting the raised master with the liquid resin without contacting any surrounding supporting surface regions of said carrier.

33. A method according to claim 20 wherein the step of providing a master includes the step of providing a substantially smooth cylindrical outside surface of a drum as said carrier with said master being raised above said drum surface.

34. A method according to claim 20 wherein the step of curing the resin includes the step of directing a beam of electrons through said sheet material to said resin.

35. A method according to claim 20 which additionally comprises the step of coating with light reflective material substantially only the area of the hardened resin diffraction pattern of said sheet in a manner to follow its surface relief pattern.

36. A method according to claim 35 which additionally comprises the step of applying a substantially transparent overcoating to substantially only an area of the reflecting coated diffraction pattern by use of a Gravure cylinder.

37. A method according to any one of claims 21-23, inclusive, wherein all the steps recited therein are performed in a continuous process upon each single sheet of material.

38. A method of mass producing replicas of a surface relief hologram on sheets of material with a given set of dimensions, comprising the following steps for each sheet:
providing a master of said surface relief hologram of defined dimensions and attached to a carrier in a manner to be substantially surrounded by regions without a surface relief pattern,
applying casting resin in liquid form to the surface relief master in a manner to substantially avoid coating said surrounding regions of said carrier,
contacting one side of said sheet with at least the resin coated surface relief master, thereby to contact said sheet material with said resin in an area having dimensions corresponding to said defined dimensions of the surface relief hologram master,
curing said resin while being held inbetween the sheet and the surface relief master without movement therebetween, thereby to substantially harden the resin in attachment with said sheet, and
separating said surface relief master from the hardened resin and sheet, thereby to leave the hardened resin in place on said sheet material with the surface relief hologram pattern of said master contained therein.

39. A method according to claim 38 wherein the step of providing a master includes providing said master with its said defined dimensions less than said given set of dimensions of said sheets.

40. A method according to either of claims 38 or 39 which comprises an additional step of printing a visual pattern with ink on said sheet in a continuous process with the foregoing steps of casting a hologram thereon.

41. A method according to either of claims 38 or 39 wherein said hologram is characterized by reconstructing a three-dimensional image when illuminated by light.

42. A method of treating a plurality of sheets of material, comprising the steps of:
(a) forming a surface relief light diffraction pattern on one side of one of the plurality of sheets by the following steps:
providing a master of said surface relief light diffraction pattern,
applying casting resin in liquid form to the surface relief master,
contacting said one sheet side with the resin coated surface relief master,
curing said resin while being held inbetween the sheet and the surface relief master without movement therebetween, thereby to substantially harden the resin in attachment with said sheet material, and
separating said surface relief master from the hardened resin and sheet material, thereby to leave the hardened resin in place on said sheet material with the surface relief light diffraction pattern of said master contained therein,
(b) printing a visual pattern with ink on said one sheet side in a continuous process with the foregoing diffraction pattern replication steps, and
(c) repeating the foregoing steps on additional sheets in sequence, thereby printing and forming surface relief diffraction pattern replicas on said plurality of sheets of material.

43. A method according to claim 42 therein steps (a) occur before step (b).

44. A method according to claim 43 wherein the printing step (b) includes printing over the diffraction pattern replica.

45. A method according to claim 43 wherein the printing step (b) includes printing on an area of said one sheet side that is substantially no-overlapping with said diffraction pattern replica formed by steps (a).

46. A method according to claim 42 wherein step (b) occurs before the steps (a).

47. A method according to claim 42 wherein said plurality of sheets are separate at the time of their processing.

48. A method according to claim 42 wherein said plurality sheets are provided in the form of a continuous web at the time of their processing.

49. A method according to claim 42 wherein said plurality of sheets comprise primarily paper material.

50. A method according to claim 42 wherein said plurality of sheets are of flexible material.

51. A method of mass producing multiple replicas of a surface relief light diffraction pattern on flexible substrate material, comprising the steps of:
holding a liquid casting resin between a defined area of the substrate material and a master of said surface relief pattern in a manner that said defined area of the substrate is substantially surrounded by regions without any liquid resin held thereagainst,
curing said resin while being held between the substrate material and the surface relief master without movement therebetween, thereby to substantially harden the resin in attachment with said substrate material, and
separating said surface relief master from the hardened resin and substrate material, thereby to leave the hardened resin in place on said substrate material with the surface relief light diffraction pattern of said master contained in a surface thereof, and
repeating the foregoing steps on additional areas of the substrate material that are non-overlapping with said defined area, thereby casting multiple replicas of said surface relief diffraction pattern.

52. A method according to claim 51 which comprises an additional step of printing a visual pattern with ink on said one side of said substrate material.

53. A method according to claim 52 wherein the step of printing the substrate occurs before the step of contacting the substrate with resin.

54. A method according to claim 52 wherein the steps of holding resin against the substrate, curing the resin and separating the diffraction pattern master from the hardened resin all occur before the printing step.

55. A method according to any one of claims 52-54, inclusive, wherein the printing step includes printing the visual pattern on areas of the substrate material that are substantially non-overlapping with said hardened resin light diffraction pattern replicas.

56. A method according to claim 54 wherein the printing step includes printing over the hardened resin.

57. A method according to claim 51 wherein the substrate material is in the form of a continuous web of adjoining sheets that each have a given area, and wherein the liquid casting material holding step includes providing said defined area to be significantly less than the sheet material given area, thereby to form a cast diffraction pattern replica that occupies only a portion of the sheet material.

58. A method according to claim 51 wherein said substrate material is paper.

59. A method according to claim 51 wherein said surface relief diffraction pattern includes a hologram characterized by forming a discernible image of an object upon reflecting light therefrom.

60. A method according to claim 51 wherein the holding step includes the steps of:
   providing said surface relief master in a raised portion of a supporting surface carrier, and
   contacting the raised master with the liquid resin substantially without contacting any surrounding supporting surface regions of said carrier.

61. A method according to claim 51 wherein the step of providing a master includes the step of providing a substantially smooth cylindrical outside surface of a drum as said carrier with said master being raised above said drum surface.

62. A method according to claim 51 wherein the step of curing the resin includes the step of directing a beam of electrons through said substrate material to said resin.

63. A method according to claim 51 which additionally comprises the step of forming a light reflective material coating substantially only on the area of the hardened resin diffraction pattern of said substrate in a manner to follow its surface relief pattern.

64. A method according to claim 63 which additionally comprises the step of applying a substantially transparent overcoating to substantially only an area of the reflective coated diffraction pattern.

65. A method according to any one of claims 52-54, inclusive, wherein all the steps recited therein are performed in a continuous process upon said substrate material.

66. A method of treating substrate material, comprising the steps of:
   (a) repeatedly forming a plurality of surface relief light diffraction patterns along a length of the substrate material on one side thereof, by the following steps:
      holding a liquid casting resin between the substrate material and a master of said surface relief pattern,
      curing said resin while being held between the substrate material and the surface relief master without movement therebetween, thereby to substantially harden the resin in attachment with said substrate material, and
      separating said surface relief master from the hardened resin and substrate material, thereby to leave the hardened resin in place on said substrate material with the surface relief light diffraction pattern of said master contained therein, and
   (b) repeatedly printing a given visual pattern with ink along the length of said one substrate side in a continuous process with the foregoing diffraction pattern forming steps.

67. A method according to claim 66 wherein the steps (a) occur before the printing step (b).

68. A method according to claim 67 wherein the printing step (b) includes printing over the diffraction pattern replica.

69. A method according to claim 67 wherein the printing step (b) includes printing on regions of said one substrate side that are substantially non-overlapping with said diffraction pattern formed by steps (a).

70. A method according to claim 66 wherein the printing step (b) occurs before the steps (a).

71. A method according to claim 66 wherein the cast diffraction pattern and given printing pattern are repeated adjacent one another along the length of said substrate material web.

72. A method according to claim 66 wherein said substrate material includes primarily paper material.

73. A method according to claim 66 wherein said substrate material is of flexible material.

* * * * *

UNITED STATES PATENT AND TRADEMARK OFFICE
CERTIFICATE OF CORRECTION

PATENT NO. : 4,933,120
DATED : JUNE 12, 1990
INVENTOR(S) : SALVATORE D'AMATO et al

It is certified that error appears in the above-identified patent and that said Letters Patent is hereby corrected as shown below:

Column 9, line 7, in Claim 11: after the word 'surface' insert:

--relief pattern to be one containing a diffraction pattern in the form of a hologram containing an image of a three dimensional object.--

Column 10, line 67, in Claim 36: replace "reflecting" with --reflective--

Column 12, line 3, in Claim 43: replace "therein" with --wherein--

Column 12, line 10, in Claim 45: replace "no-overlapping" with --non-overlapping--

Signed and Sealed this

Nineteenth Day of November, 1991

Attest:

HARRY F. MANBECK, JR.

Attesting Officer

Commissioner of Patents and Trademarks